Nov. 23, 1954   D. ARTESE ET AL   2,694,880
PUTTING GREEN SWEEPER
Filed July 9, 1953
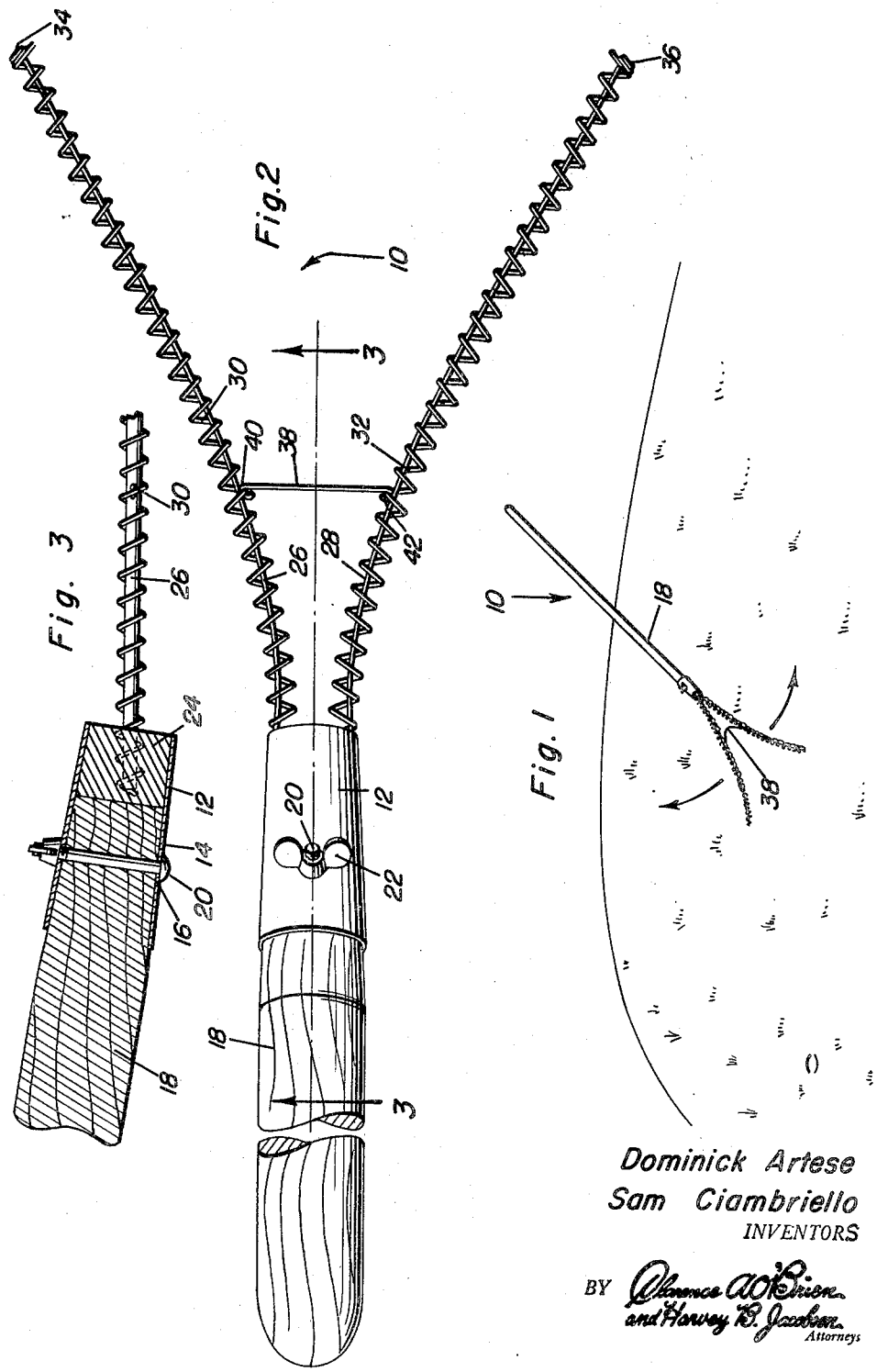
Dominick Artese
Sam Ciambriello
INVENTORS

United States Patent Office 2,694,880
Patented Nov. 23, 1954

2,694,880

PUTTING GREEN SWEEPER

Dominick Artese, New Rochelle, and Sam Ciambriello, Tuckahoe, N. Y.

Application July 9, 1953, Serial No. 366,997

3 Claims. (Cl. 47—1)

This invention relates to the class of agricultural implements and more particularly to a putting green sweeper.

The primary object of this invention resides in the provision of a tool for use in and to improve the condition of putting greens on golf courses wherein it is necessary to have an extremely smooth and unobstructed area. This device is especially adapted to remove dew from the grass, to break worm casts and ant hills, to raise the runners and prepare the grass for mowing, and to treat the putting green after it has been mowed as may be necessary.

Previously, in the care of greens, sweepers comprising bamboo poles were utilized. However, these sweepers were prone to break and were far from durable. It is therefore another object of this invention to provide a putting green sweeper which is strong and comparatively durable, which will last for at least one season thereby providing a decreased cost of equipment in the process of caretaking for golf courses, and which sweeper raises the grass better than the bamboo poles can because of the coaction between coil springs and resilient snake wires which provide means for more readily engaging the individual grass blades.

These, together with the various ancillary objects and features of the invention which will become apparent as the following description proceeds are attained by this putting green sweeper, a preferred embodiment of which has been illustrated in the accompanying drawings, by way of example only, wherein:

Figure 1 is a perspective view showing the putting green sweeper in operative use;

Figure 2 is an enlarged elevational view of the putting green sweeper; and

Figure 3 is a sectional detail view as taken along the plane of line 3—3 in Figure 2.

With continuing reference to the accompanying drawings wherein like reference numerals designate like parts throughout the various views, reference numeral 10 generally designates the putting green sweeper comprising the present invention. This agricultural equipment includes a handle socket 12 which has a hollow end portion 14 having an aperture 16 extending therethrough. The socket portion 14 is adapted to receive an elongated rod 18 forming a portion of the handle structure, the handle 18 being held in position by a bolt 20 extending through the aperture 16 and a wing nut 22 which enables the ready detachment and replacement as necessary of the handle rod 18. Embedded in the block 24, of any suitable material, in the upper portion of the handle socket member 12 are a pair of snake wires 26 and 28.

Positioned about the snake wires in embracing relationship therewith and substantially coextensive with the snake wires 26 and 28, are coil springs 30 and 32, one end of each of the coil springs 30 and 32 being embedded in the block 24. The outer end portions 34 and 36 of the coil springs 30 and 32, are secured to the outermost ends of the snake wires 26 and 28. It is to be noted that the snake wires 26 and 28 are constructed of flat metal strips which are substantially rectangular in cross-section and which are of suitable resilient construction. The snake wires 26 and 28 are inserted in the block 26, forming an angle with the axis of the rod 18 in order that the working portions of this device may more readily engage the surface of the green when used by a caretaker of the golf course. Further, the snake wires 26 and 28 are resilient and are held in a diverging position by a deformable brace 38 which is pivotally attached as at 40 and 42 to the coil springs 30 and 32. The deformable brace 38 may be made from any suitable metallic material and is adapted to permit the angle of divergence of the resilient snake wires 26 and 28 to be adjusted. When the putting green sweeper is operated with a swinging motion from right to left while the operator is walking slowly forward, it may be necessary to adjust the position of the spring-like snake wires 26 and 28 when something rough on the green and of considerable size, such as an ant hill is encountered. Then, the operator can bring the flat snake wires 26 and 28 closer together by bending the common wire or brace 38 to a V-shape, such as indicated in Figure 1, thus, obtaining a more rigid structure which will enable a stronger stroke to be applied to the ant hill. However, this stronger stroke is not desirable in all instances and as soon as the ant hill has been leveled, the operator may then straighten the brace wire 38.

Since from the foregoing the construction and advantages of this agricultural implement are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may readily be resorted to which fall within the scope of the appended claims.

What is claimed as new is as follows:

1. A putting green sweeper comprising a handle structure, a pair of resilient snake wires attached to said handle structure, coil springs positioned about said snake wires and substantially co-extensive therewith, and a deformable brace holding said snake wires in a diverging position relative to each other.

2. A putting green sweeper comprising a handle structure, a pair of resilient snake wires attached to said handle structure, coil springs positioned about said snake wires and substantially co-extensive therewith, and a deformable brace terminally secured to said coil springs adjustably holding said snake wires in a diverging position relative to each other.

3. A putting green sweeper comprising a handle structure, a pair of resilient snake wires attached to said handle structure, coil springs positioned about said snake wires and substantially co-extensive therewith, and a deformable brace terminally secured to said coil springs adjustably holding said snake wires in a diverging position relative to each other, said handle structure including a handle socket, and an elongated handle rod detachably secured to said handle socket.

References Cited in the file of this patent

UNITED STATES PATENTS

| Number | Name | Date |
|---|---|---|
| 1,748,354 | Laing | Feb. 25, 1930 |

FOREIGN PATENTS

| Number | Country | Date |
|---|---|---|
| 219,379 | Germany | Feb. 22, 1910 |